United States Patent
Zhou et al.

(10) Patent No.: US 10,395,048 B2
(45) Date of Patent: Aug. 27, 2019

(54) METHOD FOR PROTECTING CLOUD STORAGE VIDEO DATA AND SYSTEM THEREOF

(71) Applicant: HANGZHOU HIKVISION DIGITAL TECHNOLOGY CO., LTD., Hangzhou (CN)

(72) Inventors: Bo Zhou, Hangzhou (CN); Chun Yan, Hangzhou (CN); Qiqian Lin, Hangzhou (CN)

(73) Assignee: HANG ZHOU HIKVISION DIGITAL TECHNOLOGY CO., LTD., Hang Zhou (CN)

( * ) Notice: Subject to any disclaimer, the term of this patent is extended or adjusted under 35 U.S.C. 154(b) by 84 days.

(21) Appl. No.: 15/103,796

(22) PCT Filed: Aug. 14, 2014

(86) PCT No.: PCT/CN2014/084427
§ 371 (c)(1),
(2) Date: Jun. 10, 2016

(87) PCT Pub. No.: WO2015/085787
PCT Pub. Date: Jun. 18, 2015

(65) Prior Publication Data
US 2016/0300071 A1    Oct. 13, 2016

(30) Foreign Application Priority Data
Dec. 10, 2013   (CN) .......................... 2013 1 0672430

(51) Int. Cl.
*G11B 7/006*    (2006.01)
*G06F 21/62*    (2013.01)
(Continued)

(52) U.S. Cl.
CPC .......... *G06F 21/6218* (2013.01); *G06F 16/73* (2019.01); *H04L 63/1441* (2013.01);
(Continued)

(58) Field of Classification Search
None
See application file for complete search history.

(56) References Cited

U.S. PATENT DOCUMENTS

| 5,485,595 A | * | 1/1996 | Assar ..................... G06F 3/0601 365/185.11 |
| 5,948,062 A | | 9/1999 | Tzelnic et al. |

(Continued)

FOREIGN PATENT DOCUMENTS

| CN | 101192262 | 6/2008 |
| CN | 101999126 | 3/2011 |

(Continued)

OTHER PUBLICATIONS

International Search Report and Written Opinion, dated Nov. 21, 2014; PCT/CN2014/084427 with English translation (16 pages).

*Primary Examiner* — Venkat Perungavoor
(74) *Attorney, Agent, or Firm* — Hamre, Schumann, Mueller & Larson, P.C.

(57) ABSTRACT

A method for protecting video data stored in a cloud and a system thereof. The method comprises the following steps: when video data needs to be protected, setting a corresponding locking mark and information represents a locking duration for the video data; when the locking duration of the video data that has been locked ends, removing the locking mark corresponding to the video data; when cyclic overwriting is required, overwriting video data with longest storage time and without a corresponding locking mark with new video data to be stored. A locking mark is set for video data that needs to be protected in past time and future time scopes so that the video data after locking will not be lost (Continued)

due to cyclic overwriting. Setting a locking password can prevent a problem that key video is deleted by mistake when a user manually deletes a video data file and can prevent key video data from being deleted maliciously by human at the same time.

7 Claims, 3 Drawing Sheets

(51) Int. Cl.
  *G06F 16/73* (2019.01)
  *H04N 21/231* (2011.01)
  *H04N 21/254* (2011.01)
  *H04N 21/266* (2011.01)
  *H04N 21/274* (2011.01)
  *H04L 29/06* (2006.01)
  *G11B 7/0055* (2006.01)

(52) U.S. Cl.
  CPC ... *H04N 21/23113* (2013.01); *H04N 21/2541* (2013.01); *H04N 21/26613* (2013.01); *H04N 21/274* (2013.01)

(56) References Cited

U.S. PATENT DOCUMENTS

| | | | |
|---|---|---|---|
| 7,054,990 B1* | 5/2006 | Tamura | G06F 12/1466 711/103 |
| 8,468,305 B2* | 6/2013 | Gao | G06F 21/6218 711/103 |
| 8,566,409 B2* | 10/2013 | Wang | H04M 1/72547 455/412.1 |
| 2007/0162525 A1* | 7/2007 | Abe | G06F 17/30117 |
| 2008/0183802 A1* | 7/2008 | Gray | G06F 17/30117 709/203 |
| 2009/0037660 A1 | 2/2009 | Fairhurst | |
| 2012/0072683 A1* | 3/2012 | Iliadis | G06F 12/0246 711/159 |
| 2012/0260347 A1 | 10/2012 | Whitfield, Jr. et al. | |
| 2012/0317082 A1* | 12/2012 | Anwar | G06Q 10/10 707/692 |
| 2013/0097275 A1* | 4/2013 | Wofford, IV | G06F 3/0605 709/213 |
| 2013/0191895 A1 | 7/2013 | Magee et al. | |

FOREIGN PATENT DOCUMENTS

| | | | | |
|---|---|---|---|---|
| CN | 102165721 | | 8/2011 | |
| GB | 2478839 A | * | 9/2011 | ......... G06F 21/6218 |
| WO | 2009125862 | | 10/2009 | |

* cited by examiner

METHOD FOR PROTECTING CLOUD STORAGE VIDEO DATA AND SYSTEM THEREOF

TECHNICAL FIELD

The present disclosure relates to the field of cloud storage, particularly relates to a method and a system for protecting cloud storage video data.

BACKGROUND TECHNOLOGY

With an increasing number of cloud applications, the scale of cloud deployment is getting larger, data grow in a magnitude of ten millions, and a variety of cloud storage products come into being. However, these cloud storage products should have one thing in common that expired data are constantly removed to make space for storing new data, thus constantly recycling storage space to save costs. In this case, in face of user requirements that some important data are not desired to be removed even they are expired and are required to be reserved for a longer time, we need a new solution to solve this problem.

Now for some cloud storage products, users can mark corresponding data with labels as required, so as to directly query required data based on label information later, and if important data are required to be preserved for a long time, expired data need to be manually removed by human to make space for storing new data; for some cloud storage products, any type of data can be stored which is too general, so that video data storage performances of large data stream are affected, and expired data also need to be manually removed to make space. The above two cases both need unwanted data to be manually removed by human, whereas manual operations often cause some problems that important data are mistakenly removed and cannot be restored or expired data are not removed which leads to resource waste, thus operation and maintenance staff are required to be very careful and a maintenance process will naturally slow down, thereby increasing maintenance costs.

SUMMARY

The purpose of the present disclosure is to provide a method and a system for protecting cloud storage video data, where a locking flag is set for the video data required to be protected within a past time range and a future time range, so that the locked video data would not be lost due to the cyclic overwriting. Setting locking time when locking the video data, provides an unlock activation condition for clearing the locking flag later, solving the problem that storage resource is wasted due to locked data being forgotten by users.

To solve the above technical problems, one embodiment of the present disclosure discloses a method for protecting cloud storage video data, which includes the following steps:

when protection of video data is required, setting a corresponding locking flag and information representing locking time for the video data;

when the locking time of the video data having been locked is reached, clearing the corresponding locking flag for the video data;

when cyclic overwriting is required, overwriting video data which is stored for longest time without a corresponding locking flag by new video data to be stored.

Another embodiment of the present disclosure further discloses a system for protecting cloud storage video data, which includes:

a locking component configured to set a corresponding locking flag and information representing locking time for video data when the protection of video data is required;

an unlocking component configured to clear the corresponding locking flag for the video data when the locking time of the video data having been locked is reached;

a cyclic overwriting activation component configured to overwrite video data which is stored for longest time without a corresponding locking flag by new video data, when cyclic overwriting is required.

Comparing embodiments of the present disclosure with the related arts, the main differences and their effects are:

The present disclosure sets a locking flag for the video data required to be protected within a past time range and a future time range, so that the locked video data would not be lost due to the cyclic overwriting;

setting locking time when locking the video data provides an unlock activation condition for clearing the locking flag later, solving the problem that storage resource is wasted due to locked data being forgotten by users.

Further, setting a locking password can avoid the problem that users mistakenly remove critical video data when manually removing video data files, meanwhile maliciously removing critical video data by human can be prevented. Locking and locking passwords not only protect the security of critical video data, but also provide maximum operation permission to the users, which can bring a great user experience to the users.

Further, in the substep of setting a locking password, when importance or video recording types of video data are the same, same passwords are set, and when the user manually performs an unlock operation, all video data of designated video recording type within designated time range conforming to a same password can be all unlocked, which achieves the effect of batch operations.

Further, the system automatically locks the video data within the plan time period and sets a locking password, according to the locking plan set by the user, avoiding the problem that data is lost due to cyclic overwriting, other malicious removing or mistaken removing by human, in the case that the user does not timely operate.

Further, after the locked video data is automatically unlocked and the locking password is cleared, the locked video data becomes normal data without protection, if cyclic overwriting strategy requirements are met, corresponding video data would be automatically removed after cyclic overwriting time is reached, for the purpose of protecting user privacies, meanwhile solving the problem that storage resource is wasted due to locked data being forgotten by users.

DETAILED DESCRIPTION OF EMBODIMENTS

In the following description, many technical details are provided for readers to better understand the present application. However, it is understood to those skilled in the art that the technical solution claimed to be protected by those claims of the present application can also be realized, even without these technical details and not based on various changes and modifications of the following embodiments.

To make the purpose, technical solution and merits of the present disclosure clearer, the following will further describe the embodiments of the present disclosure in detail with reference to the accompanying drawings.

Figure 1:
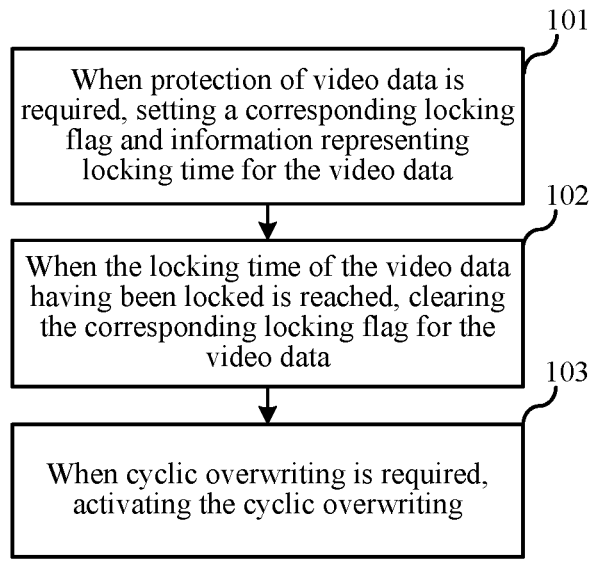
FIG. 1 is a flowchart of a method for protecting cloud storage video data in the first embodiment of the present disclosure.

The first embodiment of the present disclosure relates to a method for protecting cloud storage video data, and FIG. 1 is a flow chart of the method for protecting cloud storage video data.

Specifically, the method for protecting cloud storage video data includes the following steps:

In step 101, when protection of video data is required, a corresponding locking flag and information representing locking time are set for the video data.

The video data in the present disclosure includes a video recording and/or a photo, and it can be understood that video data required to be protected or critical video data refers to the data, which is not desired to be removed by the user even it is expired, and is required to be reserved for a longer time.

The video data having been set a locking flag is locked video data, and its color is different from that of the video data not having been set a locking flag, or it carries a specific symbol to prompt the user that the video data is locked video data, so as to most visually show the user that the video data is important data or the data required to be protected.

The information representing locking time may be defined in various ways, such as defined by a locking deadline, or defined by the time when locking is performed and locking time length etc., and the locking time length may be a time variable such as one hour, one day etc. and may also be a grade, for example grade 1 indicates one day, grade 2 indicates one week, grade 3 indicates two weeks etc.

Preferably, the step 101 further includes the substeps:

A locking password is set.

When a request for manually removing the video data or manually clearing the corresponding locking flag for the video data is received, a password validation is performed on the video data: if the validation is passed, the video data is removed or unlocked; otherwise the video data is rejected to be removed or unlocked.

Setting a locking password can avoid the problem that users mistakenly remove critical video data, when manually removing video data files, meanwhile maliciously removing critical video data by human can be prevented. Locking and locking passwords not only protect the security of critical video data, but also provide maximum operation permission to the users, which can bring a great user experience to the users.

Further, it can be understood that when the user takes the initiative to remove the video data. If the video data has been locked but has not been set a locking password, the video data is removed; if the video data has been locked and has been set a locking password, the user is prompted to input a locking password. If the locking password is correct, the data is removed; otherwise the data is not removed.

Preferably, in the substep of setting a locking password, different passwords are set according to different attributes of video data, and the different attributes include different video recording types of video data.

A video recording type refers to a scene or a condition where video recording data is generated, and when the scene or the condition is different, the video recording type is different. The condition may include that video data is acquired in a specific location, or video data contains a specific moving object, or video data is acquired when a specific invasion occurs, or video data is acquired at a specific time point, etc. Different video recording types can be utilized to distinguish the importance of the video data, and in some present embodiment, video recording types of video data include normal monitoring, motion detecting, alarm, etc. In other embodiments of the present disclosure, different passwords can also be set according to other attribute which is able to distinguish the importance of the video data, not limited to the above method.

In the substep of setting a locking password, when importance or video recording types of video data are the same, same passwords are set, and when the user manually performs an unlock operation, all video data of designated video recording type within designated time range conforming to a same password can be all unlocked, which achieves the effect of batch operations.

In step 102, when the locking time of the video data having been locked is reached, the corresponding locking flag for the video data is cleared.

The step 102 includes the following substeps:

detecting whether the locking time of the video data having a corresponding locking flag is reached; and clearing the corresponding locking flag for the video data, if the locking time is reached.

If the video data with the locking time reached has not expired, only an unlock operation is performed, i.e. the corresponding locking flag for the video data is cleared and the data would not be cleared; if it is expired data, it would be removed due to cyclic overwriting, and all expired data would be removed by the cyclic overwriting mechanism, and are not cleared immediately when the locking time is reached.

Figure 2:
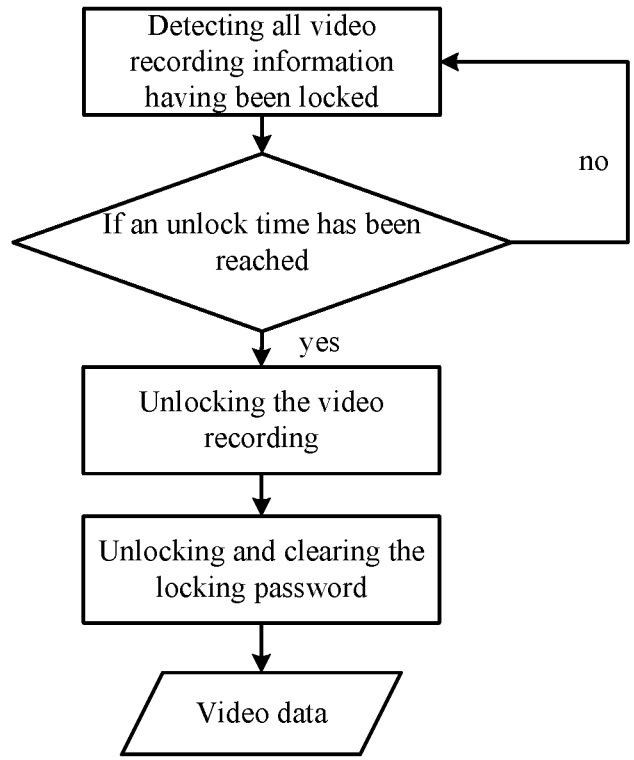
FIG. 2 is a flowchart of clearing corresponding locking flag for the video data in a method for protecting cloud storage video data in the first embodiment of the present disclosure.

Specifically, as shown in FIG. 2, locking start time and locking time for all video data being locked have been recorded in a cloud storage system, and then whether an automatic unlock time for a video data is reached is regularly detected. If an unlock time is reached, an unlock operation is performed on the video data, and a locking password should further be cleared if the locking password has been set in the step 101, so that the video data becomes normal video recording to wait for the arrival of the cyclic overwriting time. If cyclic overwriting strategy requirements are met, corresponding video data is automatically removed for the purpose of automatically protecting user privacies, meanwhile solving the problem that storage resource is wasted due to locked data being forgotten by users.

Further, it can be understood that the locked video data can either be automatically unlocked after the locking time is reached, or be manually unlocked via the locking password by the user.

In step 103, when cyclic overwriting is required, video data which is stored for longest time and does not have a corresponding locking flag is overwritten by new video data to be stored.

A cyclic overwriting refers to a function of removing expired data to release storage resource according to a storage strategy by a system, i.e. removing expired data to make space for storing new data.

Conditions for the cyclic overwriting may be various, for example: remaining memory of the system is smaller than a preset fixed value, and the preset fixed value is a remaining memory value of the system preset by the user according to his/her own requirements; or there is new video data required to be stored, while existing storage space is not enough to store the new video data; or the length from last cyclic overwriting exceeds a threshold etc.

When cyclic overwriting is activated, the system would filter the video data having been locked without performing a removing operation, in turn, the system removes the video data which satisfies the overwriting condition and has not been locked according to the cyclic overwriting strategy.

It should be noted that, steps 101 to 103 are independent with each other, and performing these steps has not a fixed order and is activated according to a real-time status of the system. A preferred implementation is to respectively perform the above steps 101, 102 and 103 in three concurrent threads or processes. When the condition for performing steps 101, 102 or 103 is satisfied, it is activated to perform corresponding operation.

As a preferred example of the present embodiment, in the step 101 of setting a corresponding locking flag and information representing locking time for the video data, the video data is existing video data, and locking the existing video data is implemented by manually locking.

The manually locking includes the following substeps:

Existing video recording information is queried.

Video data required to be protected is selected according to the queried video recording information.

A corresponding locking flag and information representing locking time are set for the video data required to be protected.

A locking password is set for the locking.

Figure 3:
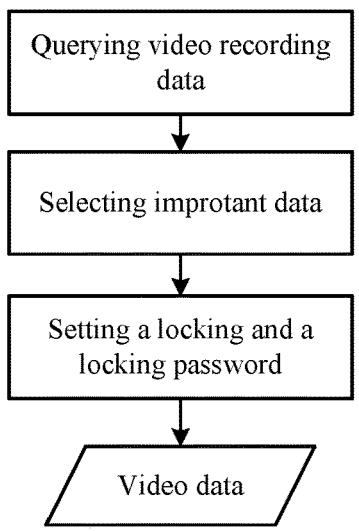
FIG. 3 is a flowchart of performing manually locking and setting a locking password in a method for protecting cloud storage video data in the first embodiment of the present disclosure.

Specifically, a process of manually locking existing video data and setting a locking password by the manually locking and unlocking function is shown in FIG. 3:

Video data is searched out by an encoder and a time range.

Important video data is selected or certain type of video recording data is designated as important data, based on the queried video recording information and his/her own definition for the importance of data by the user, and locking setting and password setting are performed on the important data. Locking setting mainly includes of two parts: setting locking start time and locking time for the video. Locking password setting is that the user sets different passwords according to different importance of video data, and the user may also set different passwords for video data of different video recording types (which distinguishes the importance of video data). The user may manually perform an unlock operation on the video data having been locked, which are of designated video recording type and within designated time range or are of all types and within designated range, according to the password set when performing the locking, and all video recording files of designated video recording type within the range conforming to the password are all manually unlocked.

When cyclic overwriting is activated, the system would filter the video data having been locked without performing a removing operation on them; when the user takes the initiative to remove the video data. If the video data has been locked but has not been set a locking password, the video data is removed; if the video data has been locked and has been set a locking password, the user is prompted to input a locking password. If the locking password is correct, the data is removed; otherwise the data is not removed.

The present disclosure sets a locking flag for the video data required to be protected within a past time range, so that the locked video data would not be lost due to the cyclic overwriting.

Setting locking time when locking the video data provides an unlock activation condition for clearing the locking flag later, solving the problem that storage resource is wasted due to locked data being forgotten by users. Setting a locking password can avoid the problem that users mistakenly remove critical video data when manually removing video data files, meanwhile maliciously removing critical video data by human can be prevented. Locking and locking passwords not only protect the security of critical video data, but also provide maximum operation permission to the users, which can bring a great user experience to the users.

The second embodiment of the present disclosure relates to a method for protecting cloud storage video data, and the second embodiment is improved based on the first embodiment, the main improvement is:

In the step 101 of setting a corresponding locking flag and information representing locking time for the video data, the video data is video data within a future time period, and automatically locking the video data within the future time period is implemented by setting a locking plan.

Figure 4:
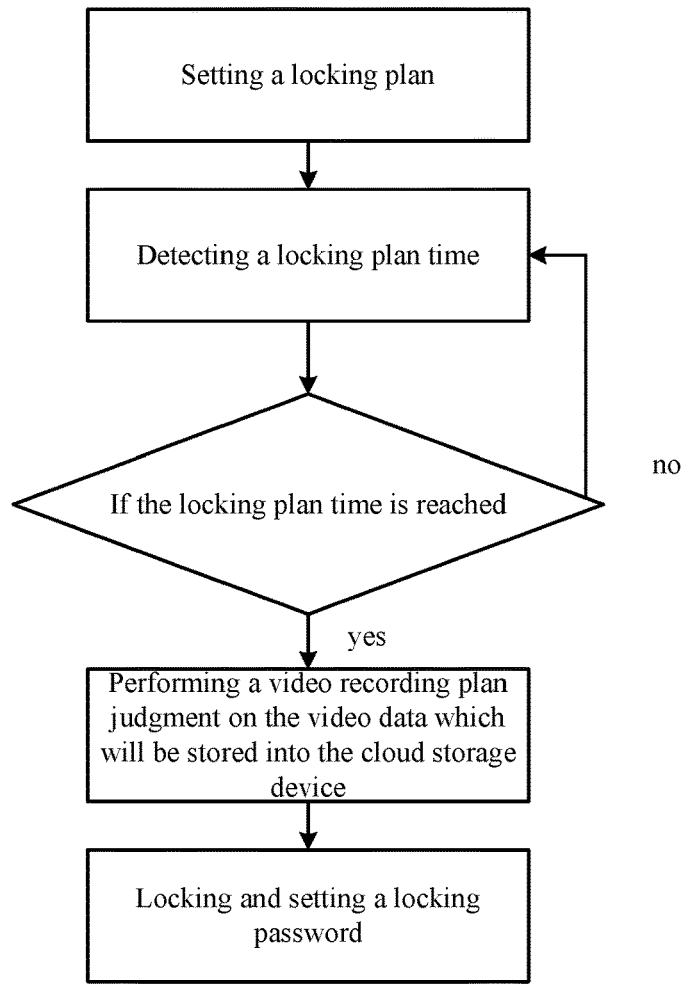
FIG. 4 is a flowchart of setting a locking plan to implement automatically locking in a method for protecting cloud storage video data in the second embodiment of the present disclosure.

Automatically locking includes the following substeps which are shown in FIG. 4:

A locking plan is set for video data of specific or all types within a future time period.

Whether the time period set by the locking plan is reached is judged.

If the set time period is reached, a corresponding locking flag and information representing locking time are automatically set for the video data matching a condition of the locking plan within the time period.

A locking password corresponding to the locking plan is set for the locking.

Preferably, in the substep of setting a locking plan for video data of specific or all types within a future time period, the locking plan includes a set time period, a video recording type and a locking password.

The set time period is used for determining to lock the video data within the time period.

The video recording type is used for determining to lock the video data of the video recording type.

Further, it can be understood that in other embodiments of the present disclosure, the locking plan can also include other attribute for determining whether the condition of automatically locking is satisfied to lock the video data.

A locking plan is set for the video data of specific or all types within a future important time period, and when the planed time period is reached, the video data matching the plan condition within the planed time period is locked and a locking password is set, which ensures data safety in a future important time period. Meanwhile the problem that data is lost due to cyclic overwriting, other malicious removing or mistaken removing by human, in the case that the user does not timely operate, is avoided.

The method embodiments of the present disclosure all can be realized by software, hardware and firmware etc. Regardless of the present disclosure is realized by software, or hardware, or firmware, the instruction codes can be stored in any type of computer accessible memory (such as permanent or modifiable, volatile or non-volatile, solid-state or non-solid, fixed or replaceable medium etc.). Similarly, the memory can be, for example, programmable array logic (PAL), random access memory (RAM), programmable read only memory (PROM), read-only memory (ROM), electrically erasable programmable ROM (EEPROM), floppy disc, optical disc, and digital versatile disc (DVD) etc.

The third embodiment of the present disclosure relates to a system for protecting cloud storage video data, and FIG. 3 is a schematic diagram of the system for protecting cloud storage video data.

Figure 5:
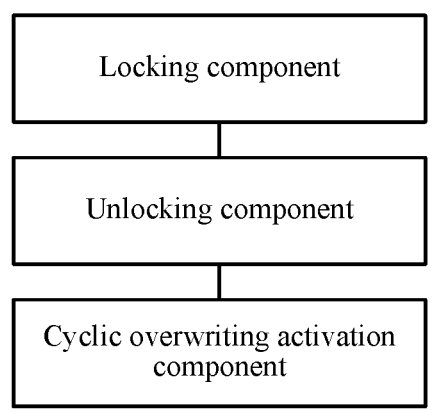
FIG. 5 is a schematic diagram of a system for protecting cloud storage video data in the third embodiment of the present disclosure.

Specifically, as shown in FIG. 5, the system for protecting cloud storage video data includes:

a locking component configured to set a corresponding locking flag and information representing locking time for video data when the protection of video data is required;

an unlocking component configured to clear the corresponding locking flag for the video data when the locking time of the video data having been locked is reached;

a cyclic overwriting activation component configured to overwrite video data which is stored for longest time without a corresponding locking flag by new video data, when cyclic overwriting is required.

Preferably, the locking component includes a subcomponent: a locking password setting subcomponent configured to set a locking password; when a corresponding locking flag is set for the video data by the locking module, the locking password is used for performing a password validation on the video data; when a request for manually removing the video data or manually clearing the corresponding locking flag for the video data is received: if the validation is passed, the video data is removed or unlocked, otherwise, the video data is rejected to be removed or unlocked.

The locking password setting subcomponent configured to set different passwords according to different attributes of video data, and the different attributes include different video recording types of video data.

The locking component includes a manual locking component, the video data locked by the manual locking component is existing video data, and locking the existing video data is implemented by manually locking.

The manual locking component includes the following subcomponents:

a querying subcomponent configured to query existing video recording information;

a selecting subcomponent configured to select video data required to be protected according to the queried video recording information;

a locking subcomponent configured to set a corresponding locking flag and information representing locking time for the video data required to be protected;

a password setting subcomponent configured to set a locking password for the manually locking.

The unlocking component includes the following subcomponents:

a detecting subcomponent configured to detect whether the locking time of the video data having a corresponding locking flag is reached;

an unlocking subcomponent configured to clear the corresponding locking flag for the video data when the detecting subcomponent detects that the locking time is reached.

Further, it can be understood that the locked video data can either be automatically unlocked after the locking time is reached, or be manually unlocked via the locking password by the user.

After the locked video data is automatically unlocked and the locking password is cleared, the locked video data becomes normal data without protection, if cyclic overwriting strategy requirements are met, corresponding video data would be automatically removed after cyclic overwriting time is reached, for the purpose of protecting user privacies, meanwhile solving the problem that storage resource is wasted due to locked data being forgotten by users.

The first embodiment is the method embodiment corresponding to this embodiment, and this embodiment and the first embodiment can be implemented in cooperation with each other. Correlated technical details disclosed in the first embodiment are still effective in this embodiment and will not be repeated here in order to reduce duplication. Correspondingly, correlated technical details disclosed in this embodiment can also be applied in the first embodiment.

The fourth embodiment of the present disclosure relates to a system for protecting cloud storage video data. The fourth embodiment is improved based on the third embodiment, and the main improvement is:

The locking component includes an automatic locking component, the video data locked by the automatic locking component is video data within a future time period, and automatically locking the video data within the future time period is implemented by setting a locking plan.

The automatic locking component includes the following subcomponents:

a locking plan setting subcomponent configured to set a locking plan for video data of specific or all types within a future time period;

a judging subcomponent configured to judge whether the time period set by the locking plan is reached;

a locking subcomponent configured to automatically set a corresponding locking flag and information representing locking time for the video data conforming to a condition of the locking plan within the time period when the set time period is reached;

a password setting subcomponent configured to set a locking password corresponding to the locking plan for the locking.

The system automatically locks the video data within the plan time period and sets a locking password according to the locking plan set by the user, avoiding the problem that data is lost due to cyclic overwriting, other malicious removing or mistaken removing by human in the case that the user does not timely operate.

The second embodiment is the method embodiment corresponding to this embodiment, and this embodiment and the second embodiment can be implemented in cooperation with each other. Correlated technical details disclosed in the second embodiment are still effective in this embodiment and will not be repeated here in order to reduce duplication. Correspondingly, correlated technical details disclosed in this embodiment can also be applied in the second embodiment.

The present disclosure is a locking and unlocking solution based on video data in a video cloud storage system, and the solution mainly has three aspects of functions: manually locking video data and unlocking, setting a locking plan to automatically lock video data, and automatically unlocking video data according to locking time.

A user performs an operation of manually locking setting or automatically locking setting, on the video data of all video recording types or specific video recording type within designated time (past time and future time) range in the cloud storage system by manually setting a locking or setting a locking plan, so that the video data stored in the cloud storage system or the video data to be stored in the cloud storage within a future time period would not be lost due to human or cyclic overwriting. Meanwhile a function of automatic unlocking according to locking time is provided to automatically unlock the locked data which is expired, and make the locked data which is expired to become normal data which can be cyclically overwritten by the system.

Innovations are mainly reflected in the following three aspects:

A solution based on video cloud storage is that important video data are manually locked and a locking password is set, which makes the important video data independent of the cyclic overwriting in the system, such that the important video data having been locked with a locking password set for it, would not be lost due to mistaken removing by human or cyclic overwriting by system within a set time range.

A locking plan is set for the video data of specific or all types which will be stored into the cloud storage system within a future important time period, which automatically locks the important video data and sets a lock password for the important video data, when the important video data are stored in the cloud system, such that the important video data would not be lost due to mistaken removing by human or cyclic overwriting by system.

An automatic unlocking causes the system to automatically change the data reaching the unlocking time into normal data, when the locking time of the video data in the cloud storage system is reached, and automatically remove the normal data after the cyclic overwriting time is reached, which protects user privacies.

It should be noted that components disclosed in each apparatus embodiment of the present disclosure are logical components, on the physical, a logic component can be a physical component, and may be part of a physical component, or implemented in combination of several physical components, and physical implementing methods for these logic components themselves are not the most important, the combination of the functions achieved by these logic components is the key to solving the technical problem disclosed in the present disclosure. Furthermore, in order to highlight innovative part of the present disclosure, the above apparatus embodiments of the present disclosure do not introduce the components which are not related closely to solving the technical problem disclosed in the present disclosure, which does not indicate that the above apparatus embodiments do not include other components.

It should be explained that in the Claims and Specification of the present disclosure, relationship terms such as first, second etc are just utilized to distinguish one entity or manipulation from another entity or manipulation, instead of requiring or indicating any practical relation or sequence existing between these entities or manipulations. And, the terms "include", "include" or any other variant indicate to nonexclusive covering, thus the process, method, article or equipment including a series of elements not only includes those elements, but also includes other elements which are not definitely listed, or inherent elements of this process, method, article or equipment. Without more limitations, the element defined by the phrase "include a" does not exclude additional same elements existing in the process, method, article or equipment of this element.

By referring to certain preferred embodiments of the present disclosure, the present disclosure has been shown and described. But it should be understood to those skilled in the art that various other changes in the forms and details may be made without departing from the principles and scope of the present disclosure.

What is claimed:

1. A method for protecting cloud storage video data, wherein the method comprises following steps:
   when receiving a request to protect video data in a memory, setting by a processor a corresponding locking flag and information representing locking time for the video data;
   when the locking time of the video data having been locked is reached, clearing by the processor the corresponding locking flag for the video data; and
   when triggering cyclic overwriting, overwriting by the processor video data which is stored for longest time without a corresponding locking flag by new video data to be stored in the memory,
   wherein the step of setting by a processor a corresponding locking flag and information representing locking time for the video data further comprises substeps:
   setting by a processor a locking password; and
   when receiving a request for manually removing the video data from the memory or manually clearing the corresponding locking flag for the video data, performing by the processor a password validation on the video data: if the validation is passed, removing or unlocking by the processor the video data; otherwise rejecting removing or unlocking by the processor the video data,
   wherein in the step of setting by the processor a corresponding locking flag and information representing locking time for the video data, the video data is video data within a future time period, and automatically locking by the processor the video data within the future time period is implemented by setting a locking plan,
   wherein the automatically locking comprises the following substeps:
   setting by the processor a locking plan for a specific type or all types of video data within a future time period;
   determining by the processor whether a time period set by the locking plan is reached;
   if the set time period is reached, automatically setting by the processor a corresponding locking flag and information representing locking time for the video data matching a condition of the locking plan within the time period; and
   setting by the processor a locking password corresponding to the locking plan for the locking.

2. The method for protecting cloud storage video data according to claim 1, wherein in the substep of setting by the processor a locking password, different passwords are set according to different attributes of video data, and the different attributes comprise different video recording types of video data.

3. The method for protecting cloud storage video data according to claim 1, wherein in the substep of setting by the processor a locking plan for a specific type or all types of video data within a future time period, the locking plan includes a set time period, a video recording type and a locking password;
   the set time period is used for determining to lock the video data within the time period; and
   the video recording type is used for determining to lock the video data of the video recording type.

4. The method for protecting cloud storage video data according to claim 1, wherein the step of clearing by the processor the corresponding locking flag for the video data when the locking time of the video data having been locked is reached further comprises the following substeps:
  detecting by the processor whether the locking time of the video data having a corresponding locking flag is reached; and
  if the locking time is reached, clearing by the processor the corresponding lock flag for the video data.

5. A system for protecting cloud storage video data, wherein the system comprises:
  a processor and a memory having computer-readable instructions which are executed by the processor to perform:
  setting a corresponding locking flag and information representing locking time for video data when receiving a request to protect video data in the memory;
  clearing the corresponding locking flag for the video data when the locking time of the video data having been locked is reached;
  overwriting video data which is stored for longest time without a corresponding locking flag by new video data in the memory, when triggering cyclic overwriting,
  wherein the computer-readable instructions are further executed by the processor to set a locking password, wherein when a corresponding locking flag is set for the video data by the processor, the locking password is used for performing a password validation on the video data; when a request for manually removing the video data from the memory or manually clearing the corresponding locking flag for the video data is received: if the validation is passed, the video data is removed or unlocked by the processor, otherwise, the video data is rejected to be removed or unlocked by the processor,
  wherein the video data locked by the processor is video data within a future time period, and automatically locking by the processor the video data within the future time period is implemented by setting a locking plan;
  the computer-readable instructions are further executed by the processor to perform:
  setting a locking plan for video data of a specific type or all types within a future time period;
  determining whether a time period set by the locking plan is reached;
  automatically setting a corresponding locking flag and information representing locking time for the video data matching a condition of the locking plan within the time period, when the set time period is reached; and
  setting a locking password corresponding to the locking plan for the locking.

6. The system for protecting cloud storage video data according to claim 5, wherein the computer-readable instructions are further executed by the processor to set different passwords according to different attributes of video data, the different attributes comprising different video recording types of video data.

7. The system for protecting cloud storage video data according to claim 5, wherein the computer-readable instructions are further executed by the processor to perform:
  detecting whether the locking time of the video data having a corresponding locking flag is reached; and
  clearing the corresponding locking flag for the video data, when the processor detects that the locking time is reached.

* * * * *